UNITED STATES PATENT OFFICE 2,636,840

INSECTICIDAL COMPOSITIONS COMPRISING BENZYL OR TETRAHYDROFURFURYL ESTER OF MUCOCHLORIC ACID

Horace D. Brown, Plainfield, N. J., assignor to Merck & Co., Inc., Rahway, N. J., a corporation of New Jersey No Drawing. Application April 17, 1951,
Serial No. 221,540

6 Claims. (Cl. 167—30)

This invention relates to novel insecticidal preparations, and more particularly to such compositions containing the benzyl or tetrahydrofurfuryl esters of mucochloric acid.

This application is a continuation-in-part of my copending application Serial No. 159,865, filed May 3, 1950, now abandoned (Case No. 2871).

It is an object of this invention to provide new compositions which are useful as insecticides for the treatment of plants, grains, organic materials, textiles and the like to protect these materials against the ravages of insects. A further object of this invention is to provide new insecticidal compositions which can be prepared from relatively inexpensive and readily available materials. Other objects of this invention will be apparent from the detailed description hereinafter provided.

In accordance with my invention, I have found that the benzyl and tetrahydrofurfuryl esters of mucochloric acid incorporated with suitable carriers are particularly valuable for insecticidal purposes. Mucochloric acid or $\alpha,\beta$-dichloro-$\beta$-formyl acrylic acid which is represented by the following formula:

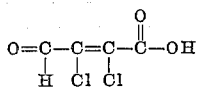

is prepared by the oxidative chlorination of furfural or 2-furoic acid.

I have found that the benzyl and tetrahydrofurfuryl esters of mucochloric acid are particularly valuable as insecticides since these compounds are highly toxic to insects but relatively non-toxic to warm-blooded animals. While other esters of mucochloric acid are also toxic to insects, the benzyl and tetrahydrofurfuryl esters are outstanding in that they appear to be more toxic and therefore more effective at lower concentrations. Further, in contrast to the lower aliphatic esters, such as the methyl or ethyl mucochloric acid esters which are lacrimators and sternutators, the benzyl and tetrahydrofurfuryl esters do not possess these undesirable properties.

The benzyl and tetrahydrofurfuryl esters of mucochloric acid are readily prepared in accordance with methods known in the art. For example, by heating mucochloric acid with an excess of benzyl or tetrahydrofurfuryl alcohol in the presence of a small amount of an acid catalyst such as hydrochloric or sulfuric acid. The corresponding benzyl or tetrahydrofurfuryl ester is formed. The ester thus formed is recovered from the reaction mixture by extraction with a suitable solvent such as ether. After evaporation of the solvent, the benzyl or tetrahydrofurfuryl ester can be recovered by fractional distillation of the resulting residue. Alternatively, the esters are also prepared by heating required amounts of the acid and alcohol in the presence of an acid catalyst such as toluene sulfuric acid and an inert diluent such as carbon tetrachloride and the carbon tetrachloride-water azeotrope removed by distillation. The ester is then recovered from the resulting reaction mixture by the procedure indicated above.

The benzyl and tetrahydrofurfuryl esters of mucochloric acid either alone or in combination with other insecticides and/or fungicidal agents of a suitable carrier thereof may be applied to plants and the like by spraying, dusting, pouring dipping, etc. in the form of solutions, suspensions, powders, and the like containing the most desirable active principles in optimum concentrations for the particular purpose at hand.

Thus, these esters may be incorporated with other insecticides and/or fungicidally active compounds such as pyrethrum, derris resins, rotenone, DDT, hexachlorocyclohexane, nicotine, lime sulfur, Bordeaux mixture, sulfur, fluosilicates, arsenates, copper salts, lead salts, thiocyano esters, and the like. The exact composition of the final insecticide will of course depend upon the particular application for which it is intended. In addition, various wetting and/or spreading agents such as sulfonated oils, salts of higher alcohol sulfates, glycerol esters, sulfonated aromatic and aliphatic hydrocarbons and salts thereof, sulfonated phenols, and the like may be added in accordance with the usual practice of the art.

The benzyl and tetrahydrofurfuryl esters of mucochloric acid can be used in suitable solvents, or mixtures of solvents at optimum concentrations with respect to the intended purpose for which it is to be used. Suitable solvents for this purpose include alcohols, esters, petroleum fractions, ketones and the like.

Further, they can be suspended in suitable vehicles or a combination of vehicles in accordance with the accepted practice in the art. For example, they can be suspended in aqueous mediums which may also contain various wetting or spreading agents and/or other insecticidal or fungicidal compounds.

Alternatively, these esters can also be used in the form of dusting powders wherein the esters are mixed with or adsorbed on finely divided carriers such as volcanic ash, kieselguhr, carbon, bentonite, fuller's earth, nut shell flours, talc and the like.

In general, these active esters may be formulated in a wide variety of carriers containing various adjuvants which may be best suited for the control of the particular pest, depending in part upon the habits and nature of these pests. Thus, compositions are prepared with the active agents in a suitable state of composition, subdivision and association which will be most effective for the particular insecticidal or fungicidal purpose at hand.

The benzyl and tetrahydrofurfuryl esters of mucochloric acid are particularly valuable for protecting woolen textiles against the ravages of such textile pests as the black carpet beetle or the webbing clothes moth. These esters can be applied to such woolen materials by any of the various methods well-known in the art for achieving a uniform dispersion of the agent on the particular textile being protected.

The concentration of the benzyl or tetrahydrofurfuryl ester being used in the above described solutions, suspensions or dusting powders are, of course, dependent upon the particular purpose for which it is intended. In general, I have found that concentration of these esters ranging from about $\frac{1}{10}$% to 10% of the weight of the carrier are useful, although for most purposes I prefer to use an amount ranging from about ½% to 5%.

The following examples are presented to illustrate specific embodiments of my invention.

EXAMPLE 1

The following method was utilized to prepare the benzyl and tetrahydrofurfuryl esters of mucochloric acid:

A solution of mucochloric acid in an excess of benzyl or tetrahydrofurfuryl alcohol containing a small amount of sulfuric acid was heated under reflux for about 24 hours. After cooling, the resulting solvent mixture was diluted with water, and extracted with ether to obtain an ether solution of the ester. This ether solution was then evaporated to obtain a residue consisting of the desired ester of mucochloric acid. If desired, this ester may be further purified by fractional distillation under diminished pressure.

The benzyl ester of mucochloric ester prepared in accordance with the foregoing process was found to be an oil having a boiling point of about 160 to 165° C. at 1 mm. Anal. calc. C, 50.99, H, 3.11, Cl, 27.37. Found: C, 52.01, H, 3.19, Cl, 26.31.

The tetrahydrofurfuryl ester also prepared in accordance with the foregoing method was found to be an oil having a boiling point of about 125 to 128° C. at 1 mm. pressure. Anal. calc. C, 42.71, H, 3.98, Cl, 28.02. Found: C, 42.85, H, 4.10, Cl, 27.72.

EXAMPLE 2

The text method employed has been described by R. E. Heal in a paper entitled, "Evaluating Protection of Fabrics from Clothes Moth and Carpet Beetle Attack" (J. Econ. Ent., 35, (2) 249–52 (1942).

Woolen fabric was impregnated with acetone solutions of the insecticides to give known concentrations on the fabric. After evaporation of the solvent, 10 larvae of the black carpet beetle (*Attagenus piceus* (Oliv.)) were confined on weighed patches of the treated fabric for two weeks. After removal of the larvae the patches were again weighed. The loss in weight of the fabric is indicated as "damage" in table below. Weight loss greater than 10 mg. is considered to be inadequate protection.

The following table shows the results of the tests with the benzyl and tetrahydrofurfuryl esters of mucochloric acid esters:

| Ester Tested | Percent Ester Applied | Damage in mg. |
|---|---|---|
| Benzyl | 2.0 | 0.6 |
| Tetrahydrofurfuryl | 0.5 | 8.5 |

Using the same method outlined above the following additional tests were conducted in order to determine the efficacy of the benzyl and tetrahydrofurfuryl esters in protecting wool from the ravages of the black carpet beetle and the webbing clothes moth:

Black carpet beetle test

| | Percent Application | Damage to wool in mg. |
|---|---|---|
| Methyl ester | 2 | 24.4 |
| Ethyl ester | 2 | 25.8 |
| Benzyl ester | 2 | 0.6 |
| Tetrahydrofurfuryl | 1 | 0.2 |

Damage greater than 10 mg. is considered inadequate protection.

Webbing clothes moth test

| | Percent Application | Damage to wool in mg. |
|---|---|---|
| Methyl ester | 2 | 29.4 |
| Ethyl ester | 2 | 40.6 |
| Benzyl ester | 2 | 6.7 |

Damage greater than 10 mg. is considered inadequate protection.

The above results indicate clearly the outstanding protection obtained by the application of the benzyl and tetrahydrofurfuryl esters in comparison with the lower alkyl esters of mucochloric acid.

EXAMPLE 3

Cockroach and milkweed bug tests

The test method employed follows a procedure of F. C. Nelson et al. as described in a paper entitled "Evaluating Liquid Insecticides" (Soap, 10, (10) 85 (1934)).

Adults of the German cockroach (*Blattella germanica* (L.)) or of the milkweed bug (*Oncopeltus fasciatus* (Dallas)) were anaesthetized with carbon dioxide and measured quantities of acetone solution of the test compound were deposited on their ventreal thoracic surfaces. Observations of mortality were made daily up to the end of four days.

When the tetrahydrofurfuryl ester of mucochloric acid is tested in this manner it is found that when applied at the rate of 2,000 mg. per kg. 95% of the cockroaches and 100% of the milkweed bugs were killed.

EXAMPLE 4

Stored grain insects

The confused flour beetle (*Tribolium confusum* (Duval)) was chosen as a typical pest of stored grains. The benzyl ester of mucochloric acid was found to be very effective in controlling this insect. The test was made by dissolving the compound in a volatile solvent (e. g., $CCl_4$, $CHCl_3$, acetone, alcohol or the like) and impregnating a weighed sample of flour with the solution. After complete evaporation of the solvent the cake was ground and screened. An equal number of control insects were placed on a starvation diet. Readings were taken at 1, 7, 14 and 28 days. Final toxicity data were based on values obtained when 50% of the control insects were dead from starvation. The data obtained in this manner served to distinguish between repellency and actual toxicity.

When the benzyl ester of mucochloric acid is tested in this manner at 0.63% concentration, the kill was found to be 100%.

Various changes and modifications may be made in carrying out the present invention without departing from the spirit and scope thereof. Insofar as these changes and modifications are within the purview of the annexed claims, they are to be considered as part of my invention.

I claim:

1. An insecticidal composition containing as an active ingredient a mucochloric acid ester selected from the group consisting of benzyl and tetrahydrofurfuryl esters, and a carrier therefor.

2. An insecticidal composition containing as an active ingredient the benzyl ester of mucochloric acid, and a carrier therefor.

3. An insecticidal composition containing as an active ingredient the tetrahydrofurfuryl ester of mucochloric acid, and a carrier therefor.

4. The method of killing insects which comprises contacting said insects with a mucochloric acid ester selected from the group consisting of the benzyl and tetrahydrofurfuryl esters.

5. The method of killing insects which comprises contacting said insects with the benzyl ester of mucochloric acid.

6. The method of killing insects which comprises contacting said insects with the tetrahydrofurfuryl ester of mucochloric acid.

HORACE D. BROWN.

References Cited in the file of this patent

UNITED STATES PATENTS

| Number | Name | Date |
|---|---|---|
| 2,226,183 | Staud | Dec. 24, 1940 |
| 2,362,565 | Ladd | Nov. 14, 1944 |
| 2,362,594 | ter Horst | Nov. 14, 1944 |
| 2,523,177 | Yowell | Sept. 19, 1950 |
| 2,532,579 | Thomas | Dec. 5, 1950 |
| 2,553,772 | Kittleson | May 22, 1951 |
| 2,553,778 | Hawley | May 22, 1951 |